June 22, 1926. Re. 16,366

J. G. JONES ET AL

STICKER BAND FOR PHOTOGRAPHIC CARTRIDGES

Original Filed May 24, 1922

INVENTORS,
John G. Jones & Haywood G. Dewey
BY P. L. Stinchfield
M. M. Perrine
ATTORNEYS.

Patented June 22, 1926.

Re. 16,366

UNITED STATES PATENT OFFICE.

JOHN G. JONES AND HAYWOOD G. DEWEY, OF ROCHESTER, NEW YORK, ASSIGNORS TO EASTMAN KODAK COMPANY, OF ROCHESTER, NEW YORK, A CORPORATION OF NEW YORK.

STICKER BAND FOR PHOTOGRAPHIC CARTRIDGES.

Original application filed May 24, 1922, Serial No. 563,447. Divided and application filed May 20, 1924, Serial No. 714,747. Original No. 1,575,844, dated March 9, 1926. Application for reissue filed April 28, 1926. Serial No. 105,304.

Our present invention relates to an improved sticker band intended particularly for use in a photographic roll film cartridge.

Roll film cartridges of a common type include long strips of interwound backing paper and film, the latter being secured at one end by a sticker to the paper, and the other end being free but having a sticker attached. There have been marketed such films in which the adhesive of the first mentioned stickers was water-proof or unaffected by water, the use of such stickers rendering possible the rapid assembly of the cartridge without the possible introduction of moisture at this point. It has not been possible, however, to utilize this type of sticker at the free end of the film for the reason that the permanently tacky adhesive will at once adhere to the backing paper if interwound therewith. It has, therefore, been customary to use a sticker with a water-soluble adhesive, such as glue, at this free end of the film. The use of such a sticker necessitated the dampening of the end thereof which was to be attached to the film and involved certain disadvantages.

We have perfected an improved sticker intended particularly for use at the free or unattached end of the film which overcomes these disadvantages in the process of making the cartridge and which further improves the cartridge as a photographic article. It comprises a sticker carrying an adhesive capable of being affected by water by which it may be attached to the paper when desired, but carrying also a portion coated with a permanently tacky adhesive by which it may be applied to the film without the application of water; and thus permitting the immediate winding of all the elements in a dry condition.

This application is a division of our application Serial No. 563,447, filed May 24, 1922, which matured into Patent No. 1,500,393, granted July 8, 1924.

Reference will now be made to the accompanying drawings in which the same reference characters refer throughout to the same parts.

Figure 1:
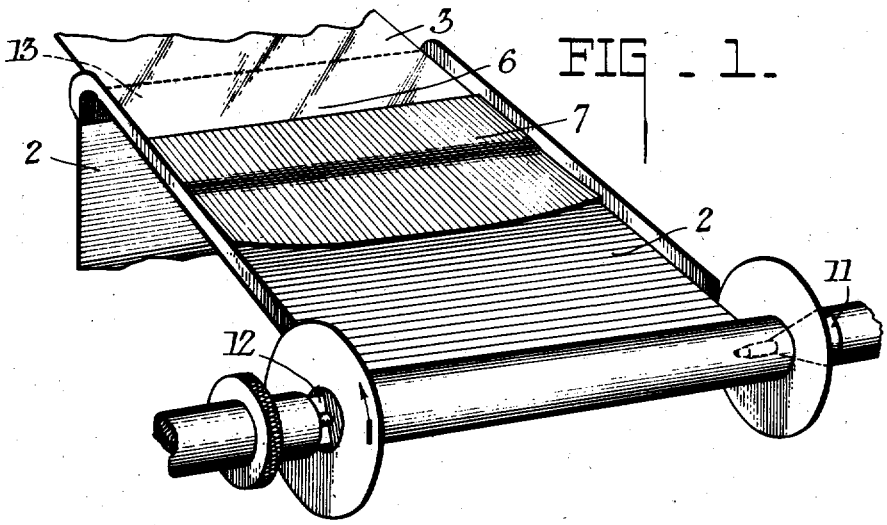
Fig. 1 is a perspective view illustrating the process of making a cartridge.
Figure 2:
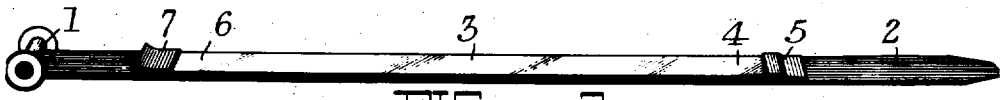
Fig. 2 is a perspective view showing a cartridge in a nearly unrolled condition.

In the drawings, 1 indicates a spool on which are interwound a long strip of protective paper 2 and a strip of photographic film 3 attached to the paper at its end 4, which is outermost when sold, by a sticker 5, the adhesive of which is preferably permanently tacky and unaffected by moisture. The inner end 6 of the film carries a sticker 7 attached thereto, but unattached to the protective strip 2.

Figure 3:
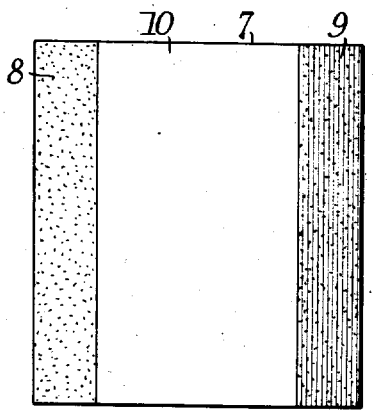
Fig. 3 is a plan of our improved sticker.

Our preferred form of sticker 7 comprises a rectangular strip, as shown in Fig. 3, along one border of which is coated a band 8 of permanently tacky adhesive material unaffected by water, and along the opposite border of which is coated a band 9 of glue or other water-soluble adhesive, leaving an uncoated intermediate portion 10.

In the process of making a cartridge a spool 1 is placed in suitable winding means, such as spindles 11, 12, which may be adapted for rotation by any desirable mechanism, either hand actuated or automatic, a machine for operating such spindles being disclosed in the pending application Serial No. 516,229, filed Nov. 18, 1921, of Jones, one of the present inventors. The end of a strip of backing paper 2 is attached to the spool which is then turned in the direction indicated by the arrow until a length sufficient for a lead strip is wound thereon. Preferably the paper is drawn from a suitable supply, not shown, over a guiding table 13. The end 6 of a strip of film 3 is now placed on this table and a sticker 7 placed thereon with adhesive band 8 in contact with the film. The rotation of the spool is then continued, interwinding the assembled film and sticker with the backing paper.

Certain advantages may here be noted in the process that are inherent in the use of the tacky adhesive. When a water-soluble adhesive is used, it is necessary to moisten the adhesive sufficiently to attach the sticker firmly to the film, the sticker must then be pressed into firm contact with the film and then preferably permitted to dry. If too much water is used, either too great an amount of moisture will be carried into the cartridge or an undesirable delay will be necessary. If too little water is used the sticker will not adhere firmly. Moreover, while the stickers may be positioned by automatic machinery, they are in practice placed by hand; and it is customary for the operator to press the sticker into adhesive contact with the fingers. If this is not uniformly done over the surface, some parts will not be stuck, especially if too little water has been used. As the adhesive dries rapidly, its adherent qualities decrease. All of these difficulties are overcome by the permanently tacky adhesive; no water is carried into the cartridge; no delay is desirable; and when the sticker is properly positioned on the film and carried into the roll, it will be pressed into firm adhesive contact by the pressure of the tight winding.

It is obvious that the cartridge as a photographic article is improved, since the possibility of the presence of undesirable moisture is greatly reduced.

It is apparent that numerous modifications may be made in the form of the sticker and we have chosen certain of the more desirable ones for purposes of illustration.

Figure 5:
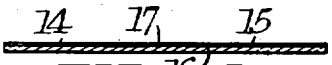
Figs. 5 and 6 are sections of other alternative forms of stickers.
Figure 6:
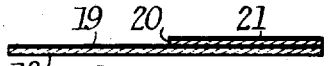

The two adhesive bands need not be separated by an intermediate uncoated portion and forms illustrative of this are shown in Figs. 5 and 6. In Fig. 5 the two coatings, 14 and 15, of waterproof and water-soluble adhesives respectively are extended from the borders of the supporting strip 16 to meet at an intermediate point 17, leaving no uncoated portion. In Fig. 6, a support 18, preferably of paper, is uniformly coated with one type of adhesive 19, and upon this is adhesively secured a smaller strip 20, preferably of paper coated with the other type of adhesive 21, this forming a sticker having portions of each type. This type offers certain manufacturing advantages.

Figure 4:
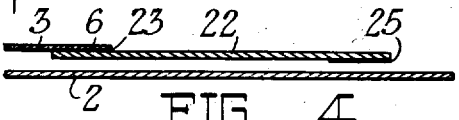
Fig. 4 is a fragmentary view showing in section an alternative form of sticker in position.
Figure 7:
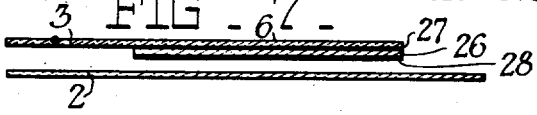
Fig. 7 is a fragmentary view showing another form of sticker in position.

It is not necessary that the two adhesive coatings be on the same side or surface of the sticker strip. In Fig. 4 is shown a strip 22 having on one surface a border 23 of permanently tacky adhesive by which it is attached to the end 6 of the film 3, and on the other surface and near the opposite edge a border 25 of dry water-soluble adhesive, which is not attached to the protective paper 2 but which may be attached thereto when desired. In Fig. 7 is shown a strip 26, the opposite surfaces of which are entirely coated with adhesive, one coating, 27, being of the permanently adhesive type by which the strip is secured to the end 6 of film 3, and the other coating, 28, being of the water-soluble type and not attached to the protective strip 2.

The adhesive which we described as waterproof or permanently tacky, is of a well known type such as is used for adhesive tapes of various kinds. A typical composition includes rubber and coal tar pitch with any suitable softener such as benzol, gasoline or chloroform. We do not limit ourselves to any particular composition since any adhesive that is so slow drying as to maintain its tackiness over a reasonable time, and the adhesive properties of which are unaffected by water is contemplated as within the scope of our invention. Similarly when we refer to water-soluble adhesive, we intend to include any glue or paste which usually dries quickly and which becomes quickly adhesive in the presence of moisture.

It is apparent that while the sticker band is particularly adapted for the uses herein described, it is capable of other uses, and particularly for use as the sealing band that is supplied at the tail end of the backing paper as sold by the manufacturer. We contemplate as within the scope of our invention all such modifications and equivalents as fall within the following claims.

Having thus described our invention, what we claim as new and desire to secure by Letters Patent is:

1. A sticker for use in roll film cartridges comprising a strip of flexible material having along one edge a band of adhesive capable of being affected by water and along the opposite edge a band of water proof adhesive material.

2. A sticker for use in roll film cartridges comprising a strip of flexible material having separated bands of adhesive material thereon, one of said bands being of waterproof material and the other of material capable of being affected by water.

3. A sticker band comprising a rectangular strip of paper having one surface and along one border thereof, a coating of adhesive material capable of being affected by water and on the same surface and along the opposite border a coating of waterproof adhesive material.

Signed at Rochester, New York, this 23rd day of April, 1926.

JOHN G. JONES.
HAYWOOD G. DEWEY.